United States Patent
Tsuji et al.

[11] Patent Number: 5,753,054
[45] Date of Patent: May 19, 1998

[54] HYDROGEN STORAGE ALLOY AND ELECTRODE THEREFROM

[75] Inventors: Yoichiro Tsuji, Katano; Osamu Yamamoto, Hirakata; Yasuharu Yamamura, Kanazawa; Hajime Seri, Izumiotsu; Yoshinori Toyoguchi, Yao, all of Japan

[73] Assignee: Matsushita Electric Industrial Co., Ltd., Osaka-Fu, Japan

[21] Appl. No.: 634,008

[22] Filed: Apr. 17, 1996

[30] Foreign Application Priority Data

Apr. 27, 1995 [JP] Japan .................. 7-103987
Aug. 10, 1995 [JP] Japan .................. 7-204831

[51] Int. Cl.$^6$ .................................. C22C 30/00
[52] U.S. Cl. .................. 148/442; 148/421; 420/900; 420/421; 420/422; 429/218
[58] Field of Search .................. 420/900, 421, 420/422; 148/421, 442

[56] References Cited

U.S. PATENT DOCUMENTS

| | | | |
|---|---|---|---|
| 4,814,002 | 3/1989 | Grasselli et al. | |
| 5,238,758 | 8/1993 | Fetcenke et al. | 429/59 |
| 5,330,861 | 7/1994 | Fetcenko et al. | 429/57 |
| 5,441,715 | 8/1995 | Gamo et al. | 423/249 |
| 5,541,017 | 7/1996 | Hong et al. | 429/59 |
| 5,575,831 | 11/1996 | Yamamura et al. | 75/614 |

FOREIGN PATENT DOCUMENTS

| | | |
|---|---|---|
| A-0 293 660 | 12/1988 | European Pat. Off. |
| A-0 450 590 | 10/1991 | European Pat. Off. |
| A-0 552-790 | 7/1993 | European Pat. Off. |
| 4-63240 | 2/1992 | Japan |
| 5-263171 | 10/1993 | Japan |
| A-06 041663 | 2/1994 | Japan |
| A-06 096762 | 4/1994 | Japan |
| WO 91/08167 | 6/1991 | WIPO |

*Primary Examiner*—John Sheehan
*Attorney, Agent, or Firm*—Panitch Schwarze Jacobs & Nadel, P.C.

[57] ABSTRACT

Addition of Mo to a Zr—Mn—V—Cr—Co—Ni, a Zr—Mn—Cr—Co—Ni hydrogen storage alloy, or those including Ti as substitution for Zr improves high-rate discharge characteristics of the hydrogen storage alloy at low temperatures. The hydrogen storage alloy is of the general formula $ZrMn_aV_bMo_cCr_dCo_eNi_f$, wherein $0.4 \leq a \leq 0.8$, $0 \leq b < 0.3$, $0 < c \leq 0.3$, $0 < d \leq 0.3$, $0 < e \leq 0.1$, $1.0 \leq f \leq 1.5$, $0.1 \leq b+c \leq 0.3$, and $2.0 \leq a+b+c+d+e+f \leq 2.4$, or $Zr_{1-x}Ti_xMn_aV_bMo_cCr_dCo_eNi_f$, wherein $0 < x \leq 0.5$, $0.4 \leq a \leq 0.8$, $0 \leq b < 0.3$, $0 < c \leq 0.3$, $0 < d \leq 0.3$, $0 < e \leq 0.1$, $1.0 \leq f \leq 1.5$, $0.1 \leq b+c \leq 0.3$, $x \leq b+c+d+e$, and $1.7 \leq a+b+c+d+e+f \leq 2.2$ or $Zr_{1-x}Ti_xMn_aMo_cM_yCr_dNi_f$ wherein M is at least one selected from the group consisting of Fe, Cu, and Zn, and wherein $0 < x \leq 0.5$, $0.4 \leq a \leq 0.8$, $0 < c \leq 0.3$, $0 \leq y \leq 0.2$, $0 < d \leq 0.3$, $1.0 \leq f \leq 1.5$, and $1.7 \leq (a+c+y+d+f) \leq 2.2$. The alloy has a C15($MgCu_2$)-type Laves phase as a main alloy phase.

5 Claims, 5 Drawing Sheets

HYDROGEN STORAGE ALLOY AND ELECTRODE THEREFROM

BACKGROUND OF THE INVENTION

1. Field of the Invention

The present invention relates to a hydrogen storage alloy, which electrochemically absorbs and disrobes hydrogen in a reversible manner, and also to an electrode prepared from such a hydrogen storage alloy.

2. Description of the Prior Art

Electrodes prepared from a hydrogen storage alloy (hereinafter referred to as hydrogen storage alloy electrodes), which can reversibly absorb and desorb hydrogen, have a larger theoretical capacity density than that of cadmium electrodes and are free from deformation or formation of dendrites as shown in zinc electrodes. The hydrogen storage alloy electrodes accordingly have excellent durability and no adverse effects on the environment and are highly expected to be applied to a negative electrode for alkaline storage batteries with a high energy density.

The alloys used for such hydrogen storage alloy electrodes are generally prepared by arc melting method or high-frequency induction heating melting method. Well-known examples include multi-component alloys of Ti—Ni system and La—Ni (or Mm—Ni) system. The multi-component alloys of Ti—Ni system are classified as an AB type (where A denotes an element having a high affinity for hydrogen, such as La, Zr, or Ti, and B represents a transition element, such as Ni, Mn, or Cr). This type of alloys show a relatively large discharge capacity during the initial charge-discharge cycles but can not maintain large discharge capacity over a long time period after the repeated charge and discharge cycles.

A variety of $AB_5$ type multi-component alloys of the La—Ni (or Mm—Ni) system have recently been developed as materials of electrodes. Especially, alloys of the Mm—Ni system have already put into practical applications. These $AB_5$ type alloys, however, have limited capacity. Development of novel hydrogen storage alloys with a larger discharge capacity is thus highly demanded.

$AB_2$ type Laves phase alloys have a relatively high ability of hydrogen absorption and are promising as the electrodes with a large capacity and excellent durability. Examples of proposed $AB_2$ type alloys include $Zr\alpha V\beta Ni\gamma M\delta$-system alloys (Japanese Laid-open Patent Publication No. 64-60961), $AxByNiz$-system alloys (Japanese Laid-open Patent Publication No. 1-102855), $Zr\alpha Mn\beta V\gamma Cr\delta Ni\epsilon$-system alloys (Japanese Laid-open Patent Publication No. 3-289041), and $ZrMn_xV_yNi_z$-system alloys (Japanese Laid-open Patent Publication No. 4-301045).

The $AB_2$ type Laves phase alloys have a larger discharge capacity than those of the Ti—Ni and La—Ni (or Mm—Ni) system alloys, and the electrodes using the $AB_2$ type Laves phase alloys have a longer life. Further improvement in performance of the electrodes has, however, been demanded. As disclosed in Japanese Laid-open Patent Publication No. 3-289041, by adjusting the composition in the Zr—Mn—V—Cr—Ni system, a hydrogen storage alloy electrode having a discharge capacity of not less than 0.34 Ah/g has been obtained. By adjusting the composition in the Zr—Mn—V—M—Ni system (wherein M represents at least one element selected from the group consisting of Fe and Co) or Zr—Mn—V—Ni system, the discharge characteristics during the initial charge-discharge cycles of a hydrogen storage alloy electrode have been improved while maintaining the high capacity as disclosed in Japanese Laid-open Patent Publication No. 4-301045.

Nickel-metal hydride batteries were prepared from such hydrogen storage alloy electrodes. Examination of the batteries showed poor high-rate discharge characteristics, especially at low temperatures.

SUMMARY OF THE INVENTION

The object of the present invention is thus to provide a hydrogen storage alloy which can give an electrode having improved high-rate discharge characteristics at low temperatures, a high ability of hydrogen absorption, and excellent initial discharge characteristics.

The present invention provides a hydrogen storage alloy represented by the general formula represented by the general formula $ZrMn_aV_bMo_cCr_dCo_eNi_f$, wherein $0.4 \leq a \leq 0.8$, $0 \leq b < 0.3$, $0 < c \leq 0.3$, $0 < d \leq 0.3$, $0 < e \leq 0.1$, $1.0 \leq f \leq 1.5$, $0.1 \leq b+c \leq 0.3$, and $2.0 \leq a+b+c+d+e+f \leq 2.4$.

The present invention also provides a hydrogen storage alloy represented by the general formula $Zr_{1-x}Ti_xMn_aV_bMo_cCr_dCo_eNi_f$, wherein $0 < x \leq 0.5$, $0.4 \leq a \leq 0.8$, $0 \leq b < 0.3$, $0 < c \leq 0.3$, $0 < d \leq 0.3$, $0 < e \leq 0.1$, $1.0 \leq f \leq 1.5$, $0.1 \leq b+c \leq 0.3$, $x \leq b+c+d+e$, and $1.7 \leq a+b+c+d+e+f \leq 2.2$.

The present invention provides a hydrogen storage alloy represented by the general formula $Zr_{1-x}Ti_xMn_aMo_yM_yCr_dNi_f$, wherein M represents at least one element selected from the group consisting of Fe, Cu, and Zn, and wherein $0 < x \leq 0.5$, $0.4 \leq a \leq 0.8$, $0 < c \leq 0.3$, $0 \leq y \leq 0.2$, $0 < d \leq 0.3$, $1.0 \leq f \leq 1.5$, and $1.7 \leq (a+c+y+d+f) \leq 2.2$.

These alloys of the invention have a C15($MgCu_2$)-type Laves phase as a main alloy phase.

In a preferred mode of the present invention, the hydrogen storage alloy comprises at least two different phases therein, one phase having a larger amount of Mo than an initial composition or batch composition and the other phase having a less amount of Mo than the initial composition.

It is preferable that the hydrogen storage alloy of the present invention is prepared by abruptly cooling the melted alloy at a cooling rate of $10^{3°}$ to $10^{7°}$ C./sec.

It is also preferable that the hydrogen storage alloy of the present invention has been subjected to a homogenizing treatment comprising exposure to 900° to 1,300° C. in a vacuum or in an inert gas atmosphere.

The present invention is also directed to a hydrogen storage alloy electrode which includes the above-mentioned hydrogen storage alloy or a hydride thereof.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
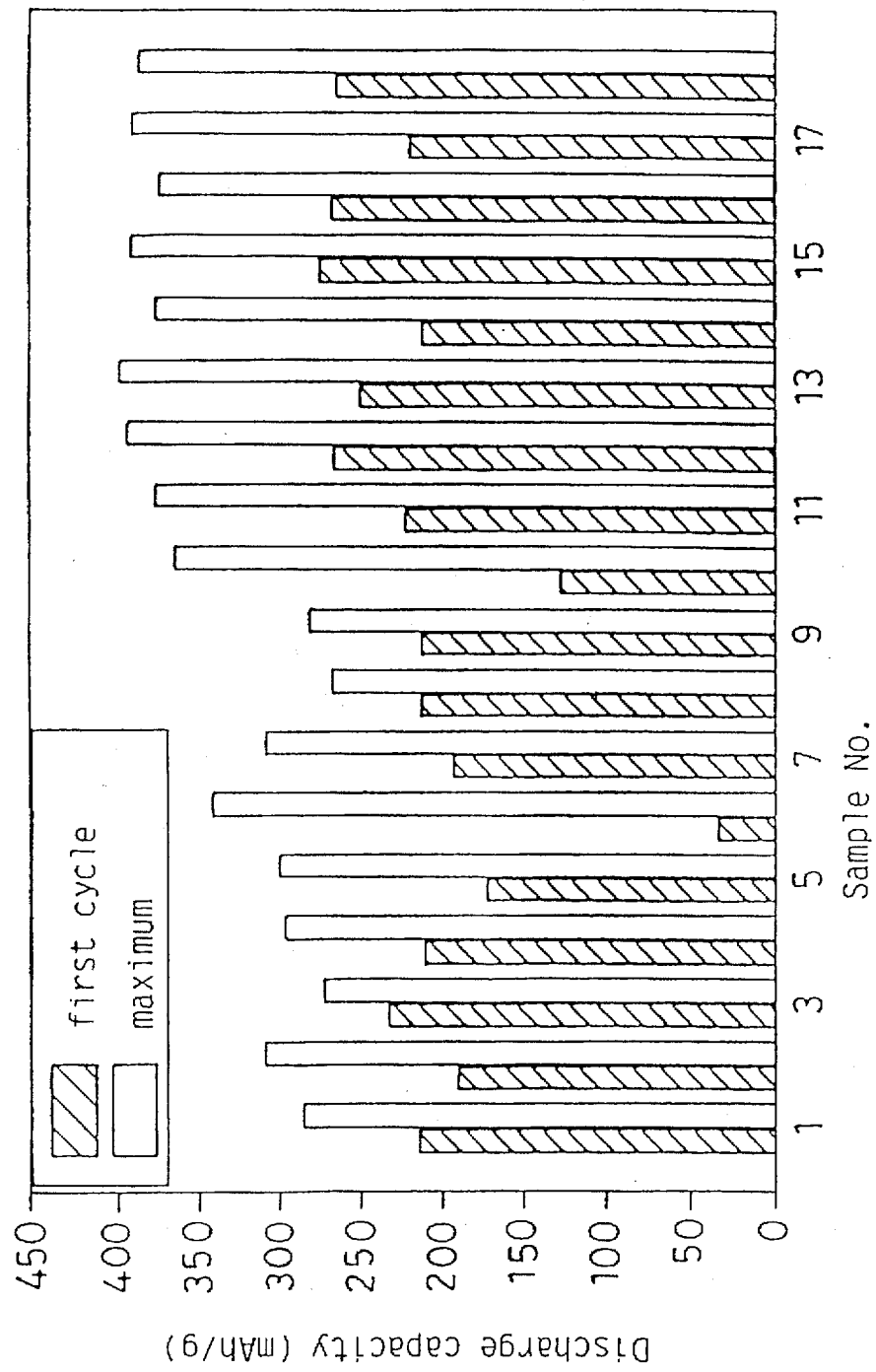
FIG. 1 is a graph showing the discharge capacity of the first cycle and the maximum discharge capacity in open-system electrodes prepared as examples of the present invention and references.

Proposed methods for improving the high-rate discharge characteristics include covering the surface with a catalyst layer of Ni or the like, plating, and adjusting the particle diameter. The inventors have tried to improve the high-rate discharge characteristics by adjusting the alloy composition and completed the present invention as a result of intensive studies. The inventors have varied the composition of hydrogen storage alloys and eventually succeeded in obtaining an improved hydrogen storage alloy having improved high-rate discharge characteristics at low temperatures while maintaining the high ability of hydrogen absorption and initial discharge characteristics.

The hydrogen storage alloy of the present invention is obtained by improving the conventional alloys of the Zr—Mn—V—Cr—Co—Ni system, the Zr—Mn—Cr—Co—Ni system, or those including Ti as substitution for Zr. Addition of Mo to the conventional alloy composition has improved the high-rate discharge characteristics at low temperatures.

Mo has a large atomic radius and increases the lattice constant of the resultant alloy crystals, thereby enhancing the ability of hydrogen absorption. Such effects are also observed in V, which, however, has a strong affinity for hydrogen and stabilizes hydrogen in the lattices, thus causing a drawback of poor discharge characteristics, especially poor high-rate discharge characteristics. Mo has a weaker affinity for hydrogen than that of V and can thus improve the high-rate discharge characteristics without lowering the ability of hydrogen absorption. Addition of Mo to the V-free alloy or substitution of Mo for V attains both the high capacity and an excellent high-rate discharge ability.

The preferable range of composition of the respective elements has been determined to ensure the high ability of hydrogen absorption and the desirable electrode performances.

The alloy represented by the general formula of $ZrMn_aV_bMo_cCr_dCo_eNi_f$ is discussed first.

As described previously, Mo improves the ability of hydrogen absorption and the low-temperature high-rate discharge characteristics. When the ratio "c" of the number of atoms of Mo to that of Zr exceeds the value of 0.3, the large lattice constant destroys the crystal structure and remarkably lowers the homogeneity of the resultant alloy, thereby decreasing the amount of hydrogen to be absorbed by the resultant alloy. Thus, it is preferred that $c \leq 0.3$.

V contributes to the increase in the amount of hydrogen that can be absorbed by and desorbed from the alloy. As is the case of Mo, when the ratio "b" of the number of atoms of V to that of Zr exceeds the value of 0.3, however, the homogeneity of the resultant alloy is remarkably worsened and the amount of hydrogen absorbed by and desorbed from the alloy is decreased. Thus, it is preferred that $b \leq 0.3$. Since V and Mo have similar effects on the crystal structure, the sum of the amounts of V and Mo, that is, (b+c) should also be not larger than 0.3.

Ni is an essential element to enable the resultant alloy to electrochemically absorb or desorb hydrogen. The minimum ratio "f" of the number of atoms of Ni to that of Zr is equal to 1.0. The less amount of Ni lowers the electrochemical discharge capacity. Since Ni increases the hydrogen equilibrium pressure of the resultant hydrogen storage alloy, addition of the excess amount of Ni undesirably decreases the amount of hydrogen that can be absorbed by the resultant alloy. The discharge capacity shows a substantial decrease for the ratio "f" of Ni larger than 1.5. Thus, it is preferred that the appropriate amount of Ni is such that $1.0 \leq f \leq 1.5$.

Co contributes to the further improvement in activity of electrochemically absorbing or desorbing hydrogen. Addition of a small amount of Co makes the alloy crystals homogeneous and increases the amount of hydrogen that can be absorbed by the resultant alloy. Since Co as well as Ni increases the hydrogen equilibrium pressure of the resultant hydrogen storage alloy, addition of the excess amount of Co undesirably decreases the amount of hydrogen that can be absorbed by the resultant alloy. Co sufficiently improves the discharge characteristics when the ratio "e" of the number of atoms of Co to that of Zr is not greater than 0.1. Thus, it is preferred that the appropriate amount of Co is such that $0 < e \leq 0.1$.

Mn influences the flatness of the hydrogen equilibrium pressure of a P-C-T curve. The ratio "a" of the number of atoms of Mn to that of Zr equal to or larger than 0.4 improves the flatness of the hydrogen equilibrium pressure and increases the discharge capacity. When the ratio "a" exceeds the value of 0.8, a large amount of the manganese dissolves from the electrode into the electrolyte solution, thereby reducing the cycle life of the electrode. It is therefor preferable that $0.4 \leq a \leq 0.8$ in the alloy.

Cr forms a passivation film covering over the surface of the alloy and thereby gives the corrosion resistance to the resultant alloy. Addition of Cr is effective for improving the cycle life and the high-temperature storage ability of the resultant cell. Addition of the excess amount of Cr, however, results in a thick passivation film, which prevents permeation of hydrogen and interferes with smooth activation. When the ratio "d" of the number of atoms of Cr to that of Zr exceeds the value of 0.3, ten or more charge-discharge cycles should be repeated unpractically for the activation. Thus, it is preferred that the appropriate amount of Cr is such that $0 < d \leq 0.3$.

The ratio (a+b+c+d+e+f) of the number of B-site atoms to the number of A-site atoms equal to or larger than 2.0 improves the homogeneity of the resultant alloy and increases the amount of hydrogen that can be absorbed by the alloy. The ratio (a+b+c+d+e+f) of larger than 2.4, however, results in an extremely small crystal lattice constant, which increases the hydrogen equilibrium pressure and lowers the ability of hydrogen absorption. Thus it is preferred that the appropriate range is such that $2.0 \leq a+b+c+d+e+f \leq 2.4$.

The alloy represented by the general formula of $Zr_{1-x}Ti_xMn_aV_bMo_cCr_dCo_eNi_f$ is discussed next.

In this alloy, Ti as well as Zr is an element of the site A. Since Ti has a small atomic radius, an increase in substitution for Zr decreases the lattice constant and the amount of hydrogen that can be absorbed by the resultant alloy. The less amount of Ti than that of Zr does not significantly decrease the discharge capacity. Although an increase in an amount of Ti tends to make it difficult to keep the C15-type Laves alloy phase, the less amount of Ti than the sum of the amounts of V, Mo, Cr, and Co in the site B does not significantly damage the crystal structure. Thus it is preferred that $x \leq b+c+d+e$.

The amounts of the other elements are determined in the same manner as in the Zr-base alloy discussed above.

Since this alloy includes Ti, the ratio $(a+b+c+d+e+f)$ of larger than 2.2 decreases the crystal lattice constant. The lower limit of 1.7 does not worsen the homogeneity of the resultant alloy. Therefore it is preferred that $1.7 \leq a+b+c+d+e+f \leq 2.2$ The alloy represented by the general formula of $Zr_{1-x}Ti_xMn_aMo_cM_yCr_dNi_f$ (wherein M represents at least one element selected from the group consisting of Fe, Cu, and Zn) is discussed next.

The amounts of elements other than M are determined in the same manner as in the above.

M (Fe,Cu,Zn) is an element having excellent electrochemical activity, and addition of M realizes the high discharge capacity from the initial stage of charge-discharge cycle. Such elements are not expensive and can reduce the total cost of the resultant alloy compared with Co.

The ratio "y" of M larger than 0.2 increases the plateau pressure and lowers the discharge capacity. Thus, it is preferred that $y \leq 0.2$.

The ratio $(a+c+y+d+f)$ of the number of B-site atoms to the number of A-site atoms equal to or larger than 1.7 remarkably improves the homogeneity of the resultant alloy and increases the discharge capacity. The ratio $(a+c+y+d+f)$ of larger than 2.2, however, results in an extremely small crystal lattice constant, which increases the plateau pressure and lowers the discharge capacity. Thus, it is preferred that $1.7 \leq (a+c+y+d+f) \leq 2.2$.

As discussed above, the alloy composition of the present invention is an essential factor for preparing a hydrogen storage alloy electrode having the high capacity and the excellent initial discharge performance and realizing the high-rate discharge characteristics at low temperatures.

The alloy prepared by arc melting method or casting method has a variety of alloy phases, which include a phase having a less content of Mo as the mother phase, another phase having a larger Mo content, and a Zr—Ti—Ni segregation phase. The distribution of alloy phases other than the mother phase significantly affects the performances of the resultant electrode. The cooling rate of the alloy equal to or larger than $10^3$° C./sec enables the alloy phases other than the mother phase to be finely distributed, thereby improving the discharge capacity and the high-rate discharge characteristics at low temperatures. The cooling rate of larger than $10^7$° C./sec, however, causes Mo to be dispersed homogeneously, thereby lowering the high-rate discharge characteristics at low temperatures. The further increase in cooling rate makes the resultant alloy amorphous and lowers the discharge capacity. The cooling rate ranging from $10^3$° to $10^7$° C./sec attains the excellent discharge capacity and high-rate discharge characteristics at low temperatures. Processes applicable for manufacturing the alloy at the cooling rate of this range include gas atomizing method, water atomizing method, and roll quenching method.

Homogenizing heat treatment improves the homogeneity and crystallinity of the alloy and especially increases the discharge capacity. The temperature of lower than 900° C. does not exert the sufficient effect of heat treatment, whereas the temperature of higher than 1,300° C. causes a large quantity of Mn to be evaporated and significantly shifts the alloy composition, thereby decreasing the discharge capacity. The time shorter than one hour does not exert the sufficient effect of heat treatment. In order to prevent oxidation of the alloy, heat treatment is preferably implemented in a vacuum or in an inert gas atmosphere. It is accordingly preferable that the alloy thus prepared is subjected to a homogenizing heat treatment at a temperature of 900° to 1,300° C. in a vacuum or in an inert gas atmosphere, for at least one hour.

The features of the present invention will become more apparent through the description of the following examples.

<Example 1>

Alloys of various compositions specified in Table 1 were prepared by heating and melting the commercially available Zr, Mn, V, Mo, Cr, Co, and Ni metals used as materials in a high-frequency induction heating furnace. These alloys were subjected to a heat treatment at 1,100° C. in a vacuum for 12 hours to prepare alloy samples.

TABLE 1

| Sample No. | Alloy composition |
| --- | --- |
| 1 | $ZrMn_{0.9}V_{0.1}Mo_{0.1}Cr_{0.1}Co_{0.1}Ni_{1.1}$ |
| 2 | $ZrMn_{0.4}V_{0.1}Mo_{0.2}Cr_{0.2}Ni_{1.2}$ |
| 3 | $ZrMn_{0.6}V_{0.1}Mo_{0.1}Co_{0.1}Ni_{1.3}$ |
| 4 | $ZrMn_{0.4}V_{0.1}Mo_{0.1}Cr_{0.1}Co_{0.1}Ni_{1.6}$ |
| 5 | $ZrMn_{0.3}V_{0.1}Mo_{0.1}Cr_{0.2}Co_{0.1}Ni_{1.4}$ |
| 6 | $ZrMn_{0.5}V_{0.1}Mo_{0.1}Cr_{0.4}Co_{0.1}Ni_{1.1}$ |
| 7 | $ZrMn_{0.5}V_{0.1}Mo_{0.1}Cr_{0.2}Co_{0.2}Ni_{1.3}$ |
| 8 | $ZrMn_{0.5}V_{0.3}Mo_{0.1}Cr_{0.1}Co_{0.1}Ni_{1.2}$ |
| 9 | $ZrMn_{0.5}V_{0.1}Mo_{0.4}Cr_{0.1}Co_{0.1}Ni_{1.1}$ |
| 10 | $ZrMn_{0.4}V_{0.3}Cr_{0.2}Co_{0.1}Ni_{1.2}$ |
| 11 | $ZrMn_{0.4}V_{0.1}Mo_{0.2}Cr_{0.2}Co_{0.1}Ni_{1.2}$ |
| 12 | $ZrMn_{0.6}V_{0.1}Mo_{0.2}Cr_{0.2}Co_{0.1}Ni_{1.1}$ |
| 13 | $ZrMn_{0.5}V_{0.2}Mo_{0.1}Cr_{0.2}Co_{0.1}Ni_{1.2}$ |
| 14 | $ZrMn_{0.4}V_{0.1}Mo_{0.1}Cr_{0.3}Co_{0.05}Ni_{1.3}$ |
| 15 | $ZrMn_{0.6}Mo_{0.3}Cr_{0.2}Co_{0.1}Ni_{1.1}$ |
| 16 | $ZrMn_{0.8}V_{0.1}Mo_{0.1}Cr_{0.2}Co_{0.1}Ni_{1.0}$ |
| 17 | $ZrMn_{0.6}V_{0.25}Mo_{0.05}Cr_{0.2}Co_{0.1}Ni_{1.2}$ |
| 18 | $ZrMn_{0.5}V_{0.1}Mo_{0.1}Cr_{0.1}Co_{0.1}Ni_{1.5}$ |

Part of each alloy sample was used for analysis, typically X-ray diffraction analysis, and measurement of hydrogen absorption-desorption ability in an atmosphere of hydrogen, that is, measurement of the conventional P (pressure of hydrogen)-C (composition)- T (temperature) curves. The residue was used to evaluate the performances of resultant electrodes.

Alloy samples of No. 1 to No. 10 were references having different constituent elements or compositions from those of the present invention, while alloy samples of No. 11 to No. 18 were examples of hydrogen storage alloys according to the present invention.

The respective alloy samples were analyzed by X-ray diffractometry. The results showed that the main component of alloy phase in each alloy sample was a C15-type Laves phase ($MgCu_2$-type face-centered cubic (fcc) structure). The alloy samples of No. 8 and No. 9 included large amounts of a C14-type Laves phase ($MgZn_2$-type hexagonal structure) and accordingly had low homogeneity. The alloy samples after the heat treatment in a vacuum had sharp fcc peaks, compared with those before the heat treatment. This shows that heat treatment increased the ratio of C15-type Laves phase and improved the homogeneity and crystallinity of the resultant alloy.

The results of P-C-T measurement showed that the alloy samples of No. 4 with a larger content of Ni and No. 7 with a larger content of Co had high hydrogen equilibrium pressure and low ability of hydrogen absorption. Addition of Mo and V increased the lattice constant and lowered the hydrogen equilibrium pressure.

For the alloy samples of No. 1 to No. 18 thus prepared, a half-cell test was carried out to evaluate the performances of the respective electrodes applied as negative electrodes of alkaline storage batteries, especially the initial discharge characteristics and the maximum discharge capacity, in the electrochemical charge and discharge reaction.

Each of the alloy samples of No. 1 to No. 18 was mechanically pulverized to particles of not larger than 38 μm and mixed with a 3% by weight aqueous solution of polyvinyl alcohol to yield a paste. The paste was charged into a foamed nickel plate having a porosity of 95% and a thickness of 0.8 mm and pressurized to prepare a negative electrode of hydrogen storage alloy. The negative electrode of hydrogen storage alloy thus prepared and a nickel oxide electrode with excess electric capacity as a counter electrode were immersed in an electrolyte solution. The electrolyte solution was an aqueous solution of potassium hydroxide having a specific gravity of 1.30. The charge and discharge test was carried out in the presence of abundant electrolyte solution in an open system of restricted capacity by the negative electrode of hydrogen storage alloy. Each cell was charged at a current of 100 mA per one gram of hydrogen storage alloy for 5.5 hours. Discharge was performed at a current of 50 mA per one gram of hydrogen storage alloy and continued until the terminal voltage decreased 0.8 V.

The graph of FIG. 1 shows the discharge capacity of the first cycle and the maximum discharge capacity in each electrode. The alloy samples of No. 6 with a larger content of Cr, No. 2 without Co, No. 1.0 without Mo, and No. 5 with a less content of Mn had small values for the discharge capacity of the first cycle. The alloy samples of No. 1 and No. 3 showed the high initial activity, but suffered from significant deterioration in capacity due to the vigorous dissolution of Mn and the like, thereby having the small maximum discharge capacity.

All the electrodes prepared according to the present invention showed the values of not less than 200 mAh/g for the discharge capacity of the first cycle and the maximum discharge capacities of 350 to 400 mAh/g. This means that these electrodes had high initial activity and high discharge capacity.

Sealed batteries were manufactured from such electrodes and evaluated for their performances.

The respective electrodes were cut to plates of 3.5 cm in width, 14.5 cm in length, and 0.50 mm in thickness. Each negative electrode was combined with a positive electrode and a separator to constitute an electrode assembly in a spiral form and was set in a battery case of size 4/5 A. The positive electrode used was a known foamed nickel electrode of 3.5 cm in width and 11 cm in length. A lead plate was welded to a terminal of the positive electrode. The separator used was a hydrophilic, polypropylene non-woven fabric. An electrolyte solution was prepared by dissolving lithium hydroxide at the concentration of 30 g/l in an aqueous solution of potassium hydroxide having a specific gravity of 1.30. A sealed battery was completed by sealing the battery case after injection of the electrolyte solution. Each battery had the nominal capacity of 1.6 Ah with restriction on capacity by the positive electrode.

Ten batteries were made for each of the alloy samples of No. 1 through No. 18 and evaluated by the charge-discharge cycle test.

Each of these batteries was charged at 0.1 C at 25° C. for 15 hours and then discharged at 0.2 C as the first charge-discharge cycle. The battery was left at 50° C. for two days, and then ten cycles of charge and discharge were carried out under the same conditions as those of the first charge-discharge cycle. All the batteries showed the discharge capacity of equal to or larger than 95% of the theoretical capacity.

Figure 2:
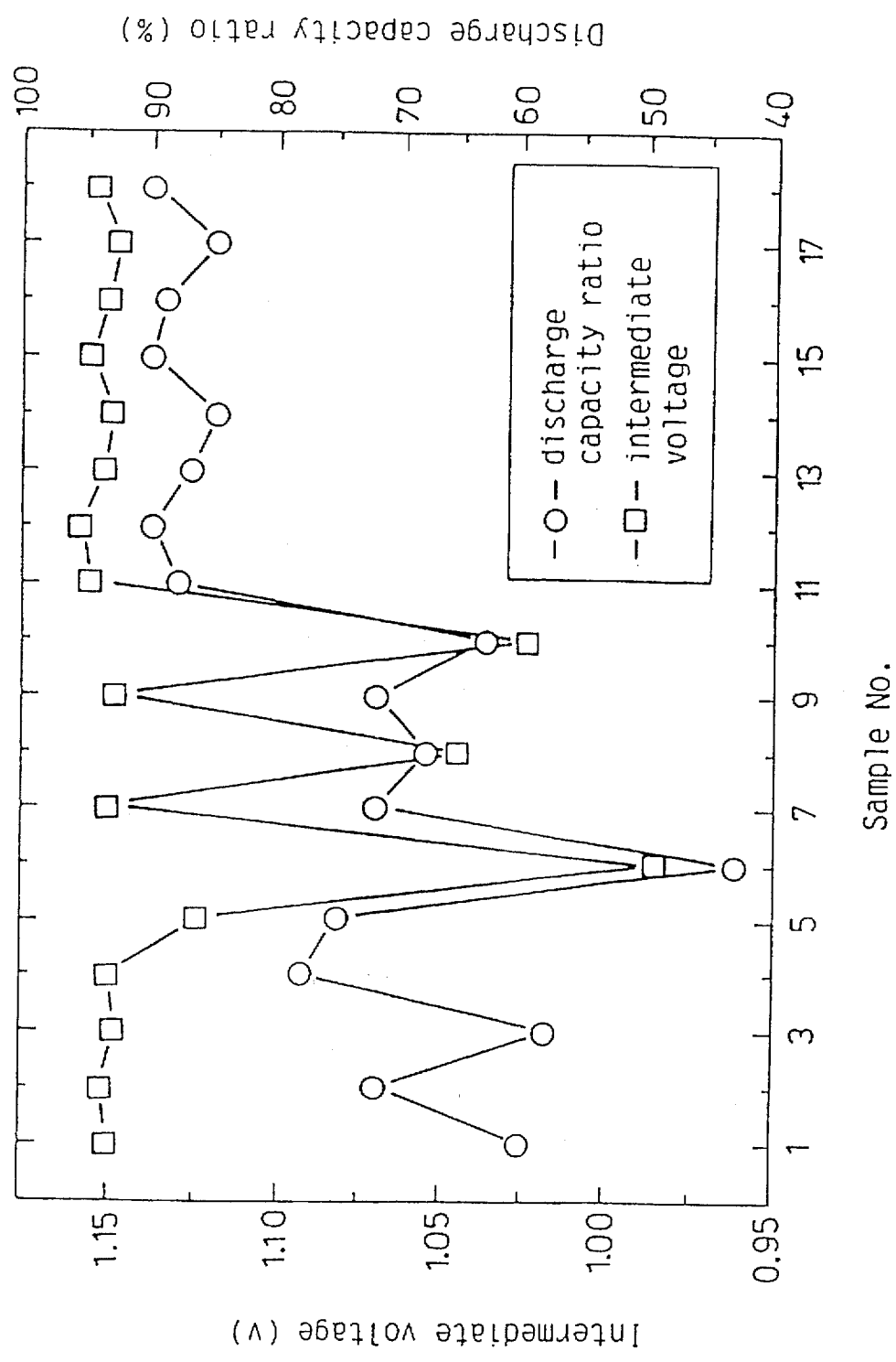
FIG. 2 is a graph showing the ratio of discharge capacity to theoretical capacity and the intermediate voltage under the condition of low-temperature high-rate discharge of positive electrode capacity-restricted cells, each having a negative electrode prepared as an example of the present invention or a reference.

In order to examine the high-rate discharge characteristics of the batteries at low temperatures, each of these batteries was charged to 150% at 0.2 C at 20° C. and then discharged at 1 C at 0° C. to a cut off voltage of 1.0 V. The graph of FIG. 2 shows the intermediate voltage and the ratio of discharge capacity to theoretical capacity of the positive electrode under the condition of 1 C discharge at 0° C.

All the batteries using the electrodes according to the present invention satisfied the two conditions, that is, the intermediate voltage of not less than 1.145 V and the discharge capacity ratio of not less than 80%, under the condition of 1 C discharge at 0° C. This means that the batteries of the present invention had excellent high-rate discharge characteristics at low temperatures.

<Example 2>

Alloys of various compositions specified in Table 2 were prepared by heating and melting the commercially available Zr, Ti, Mn, V, Mo, Cr, Co, and Ni metals used as materials in a radio-frequency induction heating furnace. These alloys were subjected to a heat treatment at 1,100° C. in a vacuum for 2 hours to prepare alloy samples.

TABLE 2

| Sample No. | Alloy composition |
| --- | --- |
| 19 | $Zr_{0.8}Ti_{0.2}Mn_{0.9}V_{0.1}Mo_{0.1}Cr_{0.1}Co_{0.1}Ni_{1.1}$ |
| 20 | $Zr_{0.8}Ti_{0.2}Mn_{0.4}V_{0.1}Mo_{0.2}Cr_{0.2}Ni_{1.2}$ |
| 21 | $Zr_{0.8}Ti_{0.2}Mn_{0.6}V_{0.1}Mo_{0.1}Co_{0.1}Ni_{1.3}$ |
| 22 | $Zr_{0.8}Ti_{0.2}Mn_{0.4}V_{0.1}Mo_{0.1}Cr_{0.1}Co_{0.1}Ni_{1.6}$ |
| 23 | $Zr_{0.8}Ti_{0.2}Mn_{0.3}V_{0.1}Mo_{0.1}Cr_{0.2}Co_{0.1}Ni_{1.4}$ |
| 24 | $Zr_{0.8}Ti_{0.2}Mn_{0.5}V_{0.1}Mo_{0.1}Cr_{0.4}Co_{0.1}Ni_{1.1}$ |
| 25 | $Zr_{0.8}Ti_{0.2}Mn_{0.5}V_{0.1}Mo_{0.1}Cr_{0.2}Co_{0.2}Ni_{1.3}$ |
| 26 | $Zr_{0.8}Ti_{0.2}Mn_{0.5}V_{0.3}Mo_{0.1}Cr_{0.1}Co_{0.1}Ni_{1.2}$ |
| 27 | $Zr_{0.8}Ti_{0.2}Mn_{0.5}V_{0.1}Mo_{0.4}Cr_{0.1}Co_{0.1}Ni_{1.1}$ |
| 28 | $Zr_{0.8}Ti_{0.2}Mn_{0.4}V_{0.3}Cr_{0.2}Co_{0.1}Ni_{1.2}$ |
| 29 | $Zr_{0.4}Ti_{0.6}Mn_{0.6}V_{0.1}Mo_{0.1}Cr_{0.2}Co_{0.1}Ni_{1.1}$ |
| 30 | $Zr_{0.5}Ti_{0.5}Mn_{0.6}V_{0.1}Mo_{0.1}Cr_{0.2}Co_{0.1}Ni_{1.1}$ |
| 31 | $Zr_{0.6}Ti_{0.4}Mn_{0.6}V_{0.1}Mo_{0.1}Cr_{0.2}Co_{0.1}Ni_{1.1}$ |
| 32 | $Zr_{0.8}Ti_{0.2}Mn_{0.6}V_{0.1}Mo_{0.1}Cr_{0.2}Co_{0.1}Ni_{1.1}$ |
| 33 | $Zr_{0.8}Ti_{0.2}Mn_{0.6}V_{0.1}Mo_{0.2}Cr_{0.2}Co_{0.1}Ni_{1.1}$ |
| 34 | $Zr_{0.8}Ti_{0.2}Mn_{0.5}V_{0.2}Mo_{0.1}Cr_{0.2}Co_{0.1}Ni_{1.2}$ |
| 35 | $Zr_{0.8}Ti_{0.2}Mn_{0.4}V_{0.1}Mo_{0.1}Cr_{0.3}Co_{0.05}Ni_{1.3}$ |
| 36 | $Zr_{0.9}Ti_{0.1}Mn_{0.6}Mo_{0.3}Cr_{0.2}Co_{0.1}Ni_{1.1}$ |
| 37 | $Zr_{0.8}Ti_{0.2}Mn_{0.8}V_{0.1}Mo_{0.1}Cr_{0.2}Co_{0.1}Ni_{1.0}$ |
| 38 | $Zr_{0.8}Ti_{0.2}Mn_{0.6}V_{0.25}Mo_{0.05}Cr_{0.2}Co_{0.1}Ni_{1.2}$ |
| 39 | $Zr_{0.8}Ti_{0.2}Mn_{0.5}V_{0.1}Mo_{0.1}Cr_{0.1}Co_{0.1}Ni_{1.5}$ |

Part of each alloy sample was used for analysis, typically X-ray diffraction analysis, and measurement of hydrogen absorption-desorption ability in an atmosphere of hydrogen, that is, measurement of the conventional P-C-T curves. The residue was used to evaluate the performances of resultant electrodes.

Alloy samples of No. 19 to No. 29 were references having different constituent elements or compositions from those of the present invention, while alloy samples of No. 30 through No. 39 were examples of hydrogen storage alloys according to the present invention.

The respective alloy samples were analyzed by X-ray diffractometry. While the alloy sample of No. 29 had a C14 phase as the main component of alloy phase, all the other alloy samples had a C15-type Laves phase ($MgCu_2$-type fcc structure) as the main component. The alloy samples of No. 26 and No. 27 included large amounts of a C14-type Laves phase ($MgZn_2$-type hexagonal structure) and accordingly had low homogeneity. The alloy samples after the heat treatment in a vacuum had sharp fcc peaks, compared with those before the heat treatment. This shows that heat treatment increased the ratio of C15-type Laves phase and improved the homogeneity and crystallinity of the resultant alloy.

The results of P-C-T measurement showed that the alloy samples of No. 22 with a larger content of Ni, No. 25 with a larger content of Co, and No. 29 with a larger content of Ti had high hydrogen equilibrium pressure and low ability of hydrogen absorption. Addition of Mo and V increased the lattice constant and lowered the hydrogen equilibrium pressure.

For the alloy samples of No. 19 to No. 39 thus prepared, a half-cell test was carried out to evaluate the performances of the respective electrodes applied as negative electrodes of alkaline storage batteries, especially the initial discharge characteristics and the maximum discharge capacity, in the electrochemical charge and discharge reaction.

The process of preparing negative electrodes of alloys, the structure of half-cells, and the charge and discharge conditions were identical with those of Example 1.

Figure 3:
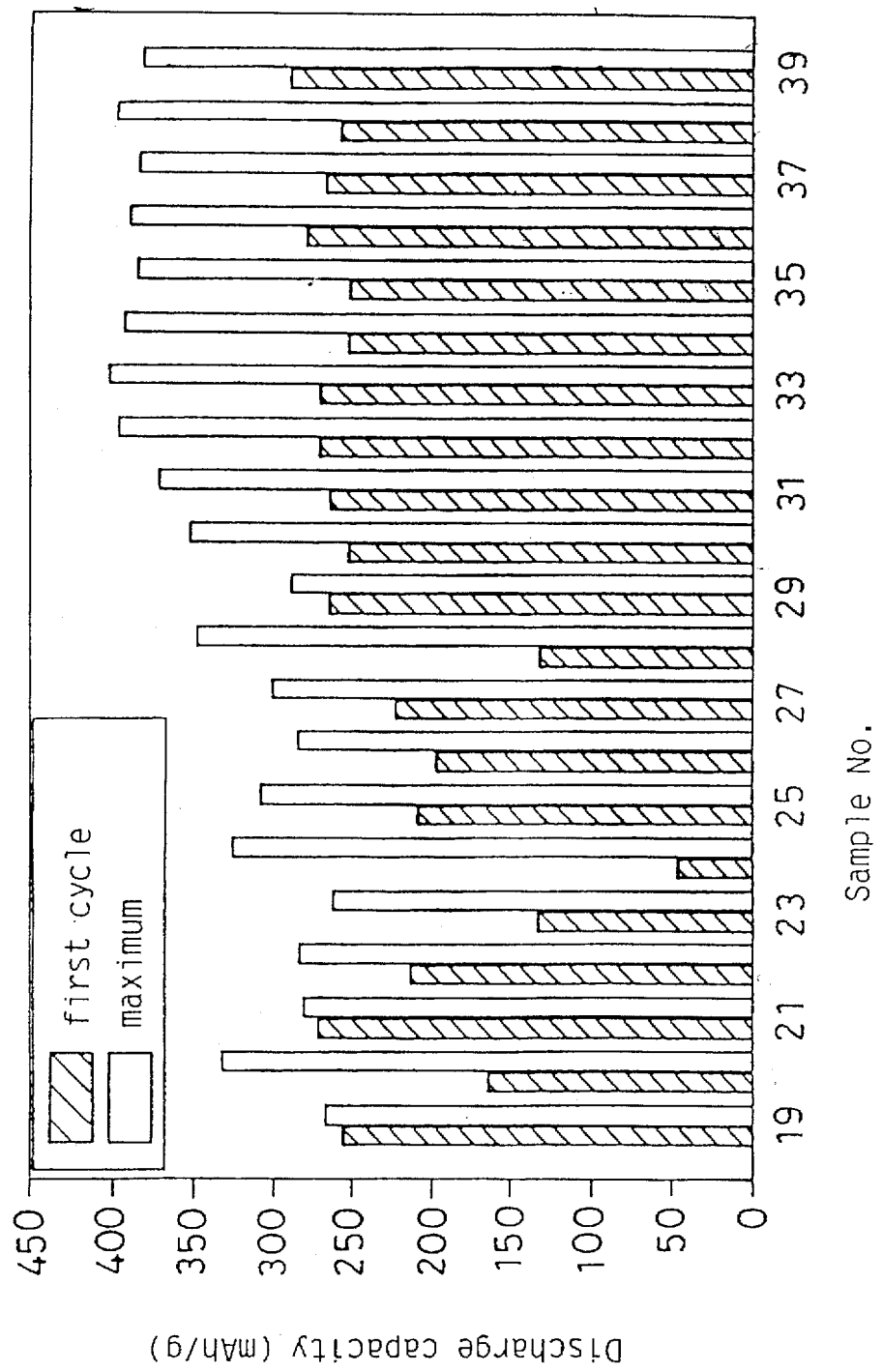
FIG. 3 is a graph showing the discharge capacity of the first cycle and the maximum discharge capacity in other open-system electrodes prepared as examples of the present invention and references.

The graph of FIG. 3 shows the discharge capacity of the first cycle and the maximum discharge capacity in each electrode. The alloy samples of No. 24 with a larger content of Cr, No. 20 without Co, No. 28 without Mo, and No. 23 with a less content of Mn had small values for the discharge capacity of the first cycle. The alloy samples of No. 19 and No. 21 showed the high initial activity, but suffered from significant deterioration in capacity due to the vigorous dissolution of Mn and the like, thereby having the small maximum discharge capacity.

All the electrodes prepared according to the present invention showed the values of not less than 250 mAh/g for the discharge capacity of the first cycle and the maximum discharge capacities of 350 to 400 mAh/g. This means that these electrodes had high initial activity and high discharge capacity.

Sealed batteries having the nominal capacity of 1.6 Ah with restriction on capacity by the positive electrode were manufactured from such alloy electrodes in the same manner as in Example 1.

Ten batteries were made for each of the alloy samples of No. 19 to No. 39 and evaluated by the charge-discharge cycle test.

Each of these batteries was charged at 0.1 C at 25° C. for 15 hours and then discharged at 0.2 C as the first charge-discharge cycle. The battery was left at 50° C. for two days, and then ten cycles of charge and discharge were carried out under the same conditions as those of the first charge-discharge cycle. All the batteries showed the discharge capacity of equal to or larger than 95% of the theoretical capacity.

Figure 4:
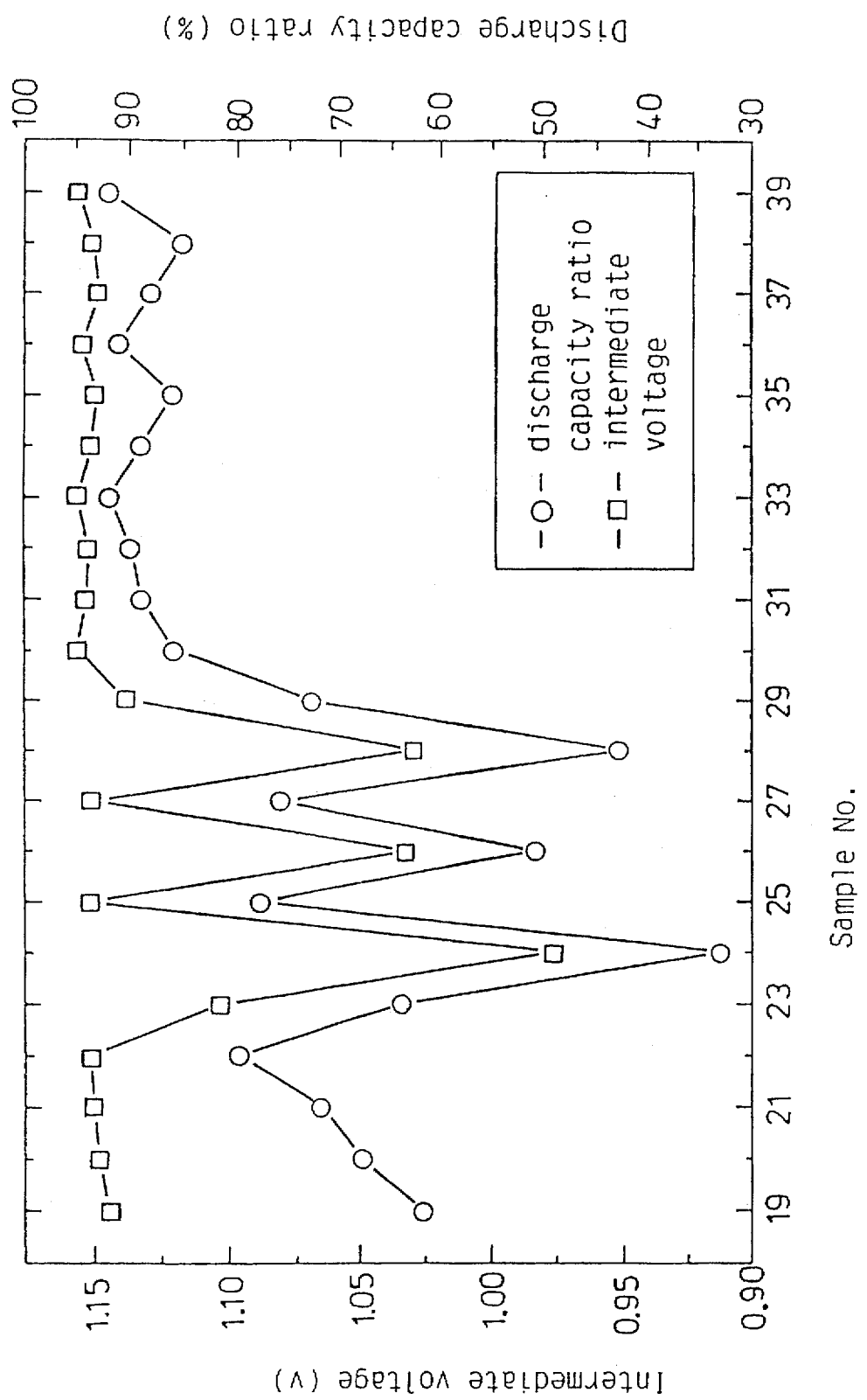
FIG. 4 is a graph showing the ratio of discharge capacity to theoretical capacity and the intermediate voltage under the condition of low-temperature high-rate discharge of other positive electrode capacity-restricted cells, each having a negative electrode prepared as an example of the present invention or a reference.

In order to examine the high-rate discharge characteristics of the batteries at low temperatures, each of these batteries was charged to 150% at 0.2 C at 20° C. and then discharged at 1 C at 0° C. to a cut off voltage of 1.0 V. The graph of FIG. 4 shows the intermediate voltage and the ratio of discharge capacity to theoretical capacity of the positive electrode under the condition of 1 C discharge at 0° C.

All the batteries using the electrodes according to the present invention satisfied the two conditions, that is, the intermediate voltage of not less than 1.145 V and the discharge capacity ratio of not less than 85%, under the condition of 1 C discharge at 0° C. This means that the batteries of the present invention had excellent high-rate discharge characteristics at low temperatures.

<Example 3>

Alloys of various compositions specified in Table 3 were prepared by heating and melting the commercially available Zr, Ti, Mn, V, Mo, Fe, Cu, Zn, Cr, and Ni metals used as materials in a high-frequency induction heating furnace. These alloys were subjected to a heat treatment at 1,000° C. in a vacuum for 12 hours to prepare alloy samples.

TABLE 3

| Sample No. | Alloy composition |
|---|---|
| 40 | $Zr_{0.8}Ti_{0.2}Mn_{0.6}V_{0.2}Cr_{0.2}Ni_{1.3}$ |
| 41 | $Zr_{0.8}Ti_{0.2}Mn_{0.9}Mo_{0.2}Cr_{0.2}Ni_{1.3}$ |
| 42 | $Zr_{0.8}Ti_{0.2}Mn_{0.3}Mo_{0.2}Cr_{0.2}Ni_{1.3}$ |
| 43 | $Zr_{0.8}Ti_{0.2}Mn_{0.6}Mo_{0.4}Cr_{0.2}Ni_{1.3}$ |
| 44 | $Zr_{0.8}Ti_{0.2}Mn_{0.6}Mo_{0.2}Cr_{0.2}Ni_{1.6}$ |
| 45 | $Zr_{0.8}Ti_{0.2}Mn_{0.6}Mo_{0.2}Cr_{0.2}Ni_{0.9}$ |
| 46 | $Zr_{0.8}Ti_{0.2}Mn_{0.6}Mo_{0.2}Cr_{0.4}Ni_{1.3}$ |
| 47 | $Zr_{0.4}Ti_{0.6}Mn_{0.6}Mo_{0.2}Cr_{0.2}Ni_{1.3}$ |
| 48 | $Zr_{0.8}Ti_{0.2}Mn_{0.7}Mo_{0.1}Cr_{0.1}Ni_{1.3}$ |
| 49 | $Zr_{0.8}Ti_{0.2}Mn_{0.8}Mo_{0.1}Cr_{0.3}Ni_{1.2}$ |
| 50 | $Zr_{0.8}Ti_{0.2}Mn_{0.6}Mo_{0.2}Cr_{0.2}Ni_{1.3}$ |
| 51 | $Zr_{0.7}Ti_{0.3}Mn_{0.6}Mo_{0.2}Cr_{0.2}Ni_{1.3}$ |
| 52 | $Zr_{0.5}Ti_{0.5}Mn_{0.6}Mo_{0.2}Cr_{0.2}Ni_{1.3}$ |
| 53 | $Zr_{0.8}Ti_{0.2}Mn_{0.7}Mo_{0.1}Cr_{0.2}Ni_{1.3}$ |
| 54 | $Zr_{0.8}Ti_{0.2}Mn_{0.7}Mo_{0.3}Cr_{0.1}Ni_{1.1}$ |
| 55 | $Zr_{0.8}Ti_{0.2}Mn_{0.5}Mo_{0.2}Cr_{0.2}Ni_{1.4}$ |
| 56 | $Zr_{0.8}Ti_{0.2}Mn_{0.7}Mo_{0.2}Cr_{0.2}Ni_{1.3}$ |
| 57 | $Zr_{0.8}Ti_{0.2}Mn_{0.4}Mo_{0.3}Cr_{0.1}Ni_{1.4}$ |
| 58 | $Zr_{0.8}Ti_{0.2}Mn_{0.6}Mo_{0.1}Cr_{0.2}Ni_{1.3}$ |
| 59 | $Zr_{0.8}Ti_{0.2}Mn_{0.7}Mo_{0.1}Cr_{0.2}Ni_{1.2}$ |
| 60 | $Zr_{0.8}Ti_{0.2}Mn_{0.7}Mo_{0.2}Cr_{0.2}Ni_{1.2}$ |
| 61 | $Zr_{0.75}Ti_{0.25}Mn_{0.7}Mo_{0.1}Cr_{0.2}Ni_{1.3}$ |
| 62 | $Zr_{0.8}Ti_{0.2}Mn_{0.7}Mo_{0.1}Fe_{0.1}Cr_{0.2}Ni_{1.3}$ |
| 63 | $Zr_{0.8}Ti_{0.2}Mn_{0.7}Mo_{0.1}Cu_{0.1}Cr_{0.2}Ni_{1.3}$ |
| 64 | $Zr_{0.8}Ti_{0.2}Mn_{0.7}Mo_{0.1}Zn_{0.1}Cr_{0.2}Ni_{1.3}$ |

Alloy samples of No. 40 to No. 47 were references having different compositions from those of the present invention, while alloy sample of No. 48 through No. 64 were examples of hydrogen storage alloys according to the present invention.

The respective alloy samples were analyzed by X-ray diffractometry. The results showed that all the alloy samples had a C15-type Laves phase ($MgCu_2$-type face-centered cubic structure) or a C14-type Laves phase ($MgZn_2$-type hexagonal closest structure) as the main component of alloy phase. The alloy samples after the heat treatment in a vacuum had sharp fcc peaks, compared with those before the heat treatment. This shows that heat treatment increased the ratio of C15-type Laves phase and improved the homogeneity and crystallinity of the resultant alloy.

For the alloy samples of No. 40 through No. 64 specified in Table 3, a half-cell test was carried out to evaluate the performances of the respective electrodes applied as negative electrodes of alkaline storage batteries in the electrochemical charge and discharge reaction.

Each alloy was pulverized to a particle size of not larger than 200 mesh. After 1 g of the alloy powder, 3 g of carbonyl nickel powder as a conductive agent, and 0.12 g of polyethylene fine powder as a binder were sufficiently mixed and stirred, the mixture was formed to a disc of 24.5 mm in diameter and 2.5 mm in thickness by pressing. The disc was heated for one hour at 130° C. in a vacuum, which melted the binder and produced a hydrogen storage alloy electrode.

A negative electrode was prepared by connecting a nickel lead wire with the hydrogen storage alloy electrode. A sintered nickel electrode with excess capacity was used as the positive electrode, while a polyamide non-woven fabric was used as the separator. Using an aqueous solution of potassium hydroxide with a specific gravity of 1.30, charge and discharge were repeated at 25° C. under the condition of a constant current. The discharge capacity in each cycle was measured. The quantity of charged electricity was 100 mA×5.5 hours per one gram of hydrogen storage alloy. Discharge was performed at a current of 50 mA per one gram of hydrogen storage alloy and continued to a cut off voltage of 0.8 V.

The alloy samples of No. 41 to No. 47 had small discharge capacities of 250 to 300 mAh/g. The alloy sample of No. 41 had a large content of Mn and thereby suffered from the significant deterioration of discharge capacity in the charge-discharge cycle, whereas the alloy samples of No. 42, No. 43, No. 44, and No. 47 had the low ability of hydrogen absorption, which resulted in the small discharge capacity. The alloy samples of No. 45 with a less content of Ni and No. 46 with a less content of Cr had the low ability of electrochemical absorption and desorption of hydrogen, which resulted in the small discharge capacity. All the other alloy samples, that is, No. 40 and No. 48 to No. 64, showed the discharge capacities of 350 to 380 mAh/g. Especially the samples of No. 62 to No. 64 respectively containing Fe, Cu, and Zn showed the discharge capacities of approximately 100 mAh/g in the first cycle, which proved the excellent initial activity.

Sealed nickel-hydrogen storage batteries were manufactured using the hydrogen storage alloys, which showed the high capacity of 350 to 38 mAh/g in the above half-cell test.

Each of the alloy samples of No. 40 and No. 48 to No. 64 was pulverized to a particle size of not larger than 300 mesh. The alloy powder was added to a dilute aqueous solution of carboxymethylcellulose with stirring to yield a paste. The paste was charged into a foamed nickel sheet having a porosity of 95% and a thickness of 0.8 mm, dried at 120° C., pressed with a roller press, and coated with fluororesin powder to prepare a negative electrode of hydrogen storage alloy.

The respective electrodes were cut to plates of 3.5 cm in width, 14.5 cm in length, and 0.50 mm in thickness. Each negative electrode was combined with a positive electrode and a separator to constitute a three-layered structure in a spiral form and was set in a battery case of size 4/5 A. The positive electrode used was a known foamed nickel electrode of 3.5 cm in width and 11 cm in length. A lead plate was attached to the positive electrode and it was welded to the positive terminal of the battery. The separator used was a hydrophilic, polypropylene non-woven fabric. An electrolyte solution was prepared by dissolving lithium hydroxide at a concentration of 30 g/l in an aqueous solution of potassium hydroxide having a specific gravity of 1.30. A sealed battery was completed by sealing the battery case after injection of the electrolyte solution. Each battery had the nominal capacity of 1.6 Ah with restriction on capacity by the positive electrode.

Each of the batteries thus prepared was charged at 0.1 C at 25° C. for 15 hours and then discharged at 0.2 C as the first charge-discharge cycle. The battery was left in an atmosphere of 50° C. for two days, and then ten cycles of charge and discharge were carried out under the same conditions as those of the first charge-discharge cycle. All the batteries showed the discharge capacity of equal to or larger than 95% of the theoretical capacity.

In order to evaluate the high-rate discharge characteristics of the batteries at low temperatures, each of these batteries was charged to 150% at 0.2 C at 20° C., discharged at 1 C at 0° C. to a cut off voltage of 1.0 V, further discharged at 0.2 C, again charged to 150% at 0.2 C at 20° C., and then discharged at 2 C at 0° C. to the cut off voltage of 1.0 V.

Figure 5:
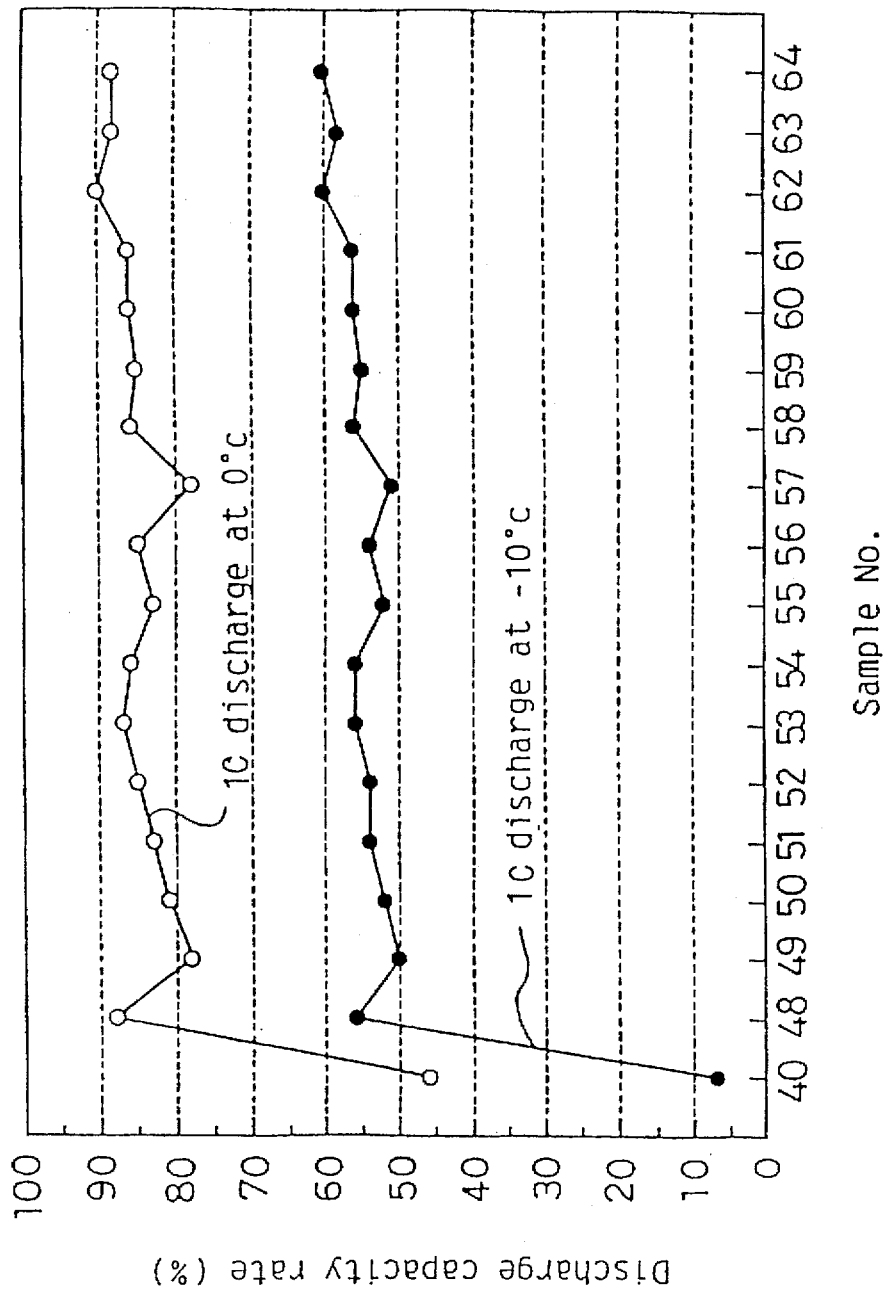
FIG. 5 is a graph showing the ratio of discharge capacity to theoretical capacity under the condition of low-temperature high-rate discharge of other positive electrode capacity-restricted cells, each having a negative electrode prepared as an example of the present invention or a reference.

The graph of FIG. 5 shows the ratio of discharge capacity to theoretical capacity of the positive electrode under the condition of 1 C discharge at 0° C. and 1 C discharge at −10° C.

The battery including the negative electrode of reference sample No. 40 had the discharge capacity ratio of approximately 50% under the condition of 1 C discharge at 0° C. and showed substantially no discharge under the condition of 1 C discharge at −10° C. The batteries including the negative electrodes of samples No. 48 to No. 64 according to the present invention, on the other hand, had the discharge capacity ratio of 78 to 90% under the condition of 1 C discharge at 0° C. and that of 50 to 60% even under the condition of 1 C discharge at −10° C. This shows that these samples No. 48 to No. 64 according to the present invention had the excellent high-rate discharge characteristics at low temperatures.

In order to examine the high-temperature storage ability, the batteries including the negative electrodes of samples No. 48 to No. 64 according to the present invention were left in the discharge state under a 65° C. atmosphere. In any of these batteries, the decrease in voltage was relatively small and no short circuit was observed even after 30 days. This shows that these samples No. 48 to No. 64 according to the present invention had the excellent high-temperature storage ability.

<Example 4>

As clearly shown in the above Examples, addition of Mo gave hydrogen storage alloys with the high capacity and excellent initial activity and high-rate discharge characteristics. This is due to the chemical properties of Mo.

In order to examine the structural factor for improving the properties, the cross section of each alloy was analyzed with a scanning electron microscope (SEM) and an electron probe X-ray microanalyzer (EPMA). The analyses showed that at least two different phases existed in the alloy, that is, one phase with a greater content of Mo and the other phase with a less content of Mo. The compositions of these phases were further analyzed with the EPMA. For example, the alloy sample of No. 12 had two phases of $ZrMn_{0.59}V_{0.11}Mo_{0.08}Cr_{0.22}Co_{0.13}Ni_{1.33}$ and $ZrMn_{0.51}V_{0.09}Mo_{0.41}Cr_{0.25}Co_{0.12}Ni_{1.03}$. The alloy sample of No. 32 had three phases of $ZrTi_{0.21}Mn_{0.56}V_{0.10}Mo_{0.04}Cr_{0.25}Co_{0.11}Ni_{1.24}$, $ZrTi_{0.20}Mn_{0.52}V_{0.09}Mo_{0.24}Cr_{0.28}Co_{0.09}Ni_{1.01}$, and $ZrTi_{0.2}Ni_{1.6}$.

The Mo-containing alloy sample of No. 2, which was not an example according to the present invention but a reference, also had two phases of $ZrMn_{0.38}V_{0.10}Mo_{0.11}Cr_{0.28}Ni_{1.31}$ and $ZrMn_{0.41}V_{0.09}Mo_{0.37}Cr_{0.21}Ni_{1.05}$.

In any sample, the phase with a less amount of Mo was the mother phase, and the phase with a greater amount of Mo and other segregation phases were distributed in insular or branch-like arrangement.

With a view to studying the multi-phase effect, alloys of these three compositions were ultra-rapidly cooled by the double roll method. Like the above Examples, these alloys were subjected to a heat treatment in a vacuum at 1,100° C. for 12 hours to prepare alloy samples. Analyses with the SEM and EPMA showed that these alloy samples were homogeneous and had no segregation phases. X-ray diffractometry showed that these alloys were not amorphous but had the C15-type Laves phase as the main component.

In the same manner as in Examples 1 and 2, electrodes were manufactured using these alloys and evaluated for their performances. Table 4 shows the comparison between the electrode performances of the multi-phase alloys of Nos. 2, 12, and 32 and those of the single-phase alloys prepared by ultra rapid cooling.

The single-phase alloys prepared by ultra rapid cooling had poor initial activity and high-rate discharge characteristics at low temperatures while substantially maintaining the maximum discharge capacity. Such phenomena were found in the reference alloy of No. 2 as well as the alloy samples according to the present invention. This is thought to be characteristic of the Mo-containing alloys. Although the results of measurement were shown for the above three alloys, the similar results were obtained for the other alloys of different compositions. For the Mo-containing alloys, the multi-phase structure is essential to attain the excellent electrode characteristics.

TABLE 4

|  | No. 2 | | No. 3 | | No. 4 | |
| --- | --- | --- | --- | --- | --- | --- |
|  | Normal | Ultra-rapid cooling | Normal | Ultra rapid cooling | Normal | Ultra-rapid cooling |
| Discharge capacity of first cycle in open system (mAh/g) | 191 | 148 | 267 | 219 | 272 | 246 |
| Maximum discharge capacity (mAh/g) | 310 | 306 | 393 | 385 | 397 | 383 |
| Ratio of discharge capacity in sealed battery at 0° C., 1C (%) | 72 | 52 | 90 | 76 | 90 | 79 |
| Intermediate voltage (V) | 1.152 | 1.116 | 1.158 | 1.132 | 1.151 | 1.135 |

<Example 5>

Alloy compositions of No. 48, No. 53, and No. 62 specified in Table 3 were melted in a high-frequency induction heating furnace, and subsequently formed to cast alloys by a casting process with an iron cast, to powders by a gas atomizing process, and to ribbon-like plates by a single roll process.

These alloys were analyzed with an electron probe X-ray microanalyzer (EPMA). All the alloys had a phase having a larger Mo content and a Zr—Ti—Ni segregation phase other than the alloy phase having a less content of Mo as the mother phase. While the alloy phases other than the mother phase were distributed rather sparsely in the form of relatively large blocks of 5 to 10 μm in the alloys prepared by casting, the alloy phases of not larger than several μm in dimensions were distributed finely in those prepared by the gas atomizing or single roll process.

Performances of the electrodes prepared from these alloys were evaluated in the same manner as in Example 3. In any alloy sample tested, the discharge capacities of the alloys prepared by a gas atomizing or single roll process were approximately 10 to 20 mAh/g larger than those of the alloys prepared by a casting process.

Sealed batteries were manufactured in the same manner as in Example 3 and tested for the high-rate discharge characteristics at low temperatures (the ratio of discharge capacity to theoretical capacity under the condition of 1 C discharge at 0° C. and 1 C discharge at −10° C.). The results of measurement are shown in Table 5. Compared with the sealed batteries using the cast alloys, those using the alloys prepared by the gas atomizing or single roll process showed excellent low-temperature high-rate discharge characteristics, especially under the condition of 1 C discharge at −10° C.

TABLE 5

| Sample No. | Process of manufacturing alloy | Ratio of discharge capacity to theoretical capacity (%) | |
| --- | --- | --- | --- |
|  |  | 0° C., 1 C | −10° C., 1 C |
| No. 48 | Casting | 88 | 58 |
|  | Gas atomizing | 92 | 72 |
|  | Single roll | 92 | 75 |
| No. 53 | Casting | 87 | 57 |
|  | Gas atomizing | 91 | 70 |
|  | Single roll | 90 | 74 |
| No. 62 | Casting | 90 | 60 |
|  | Gas atomizing | 92 | 75 |
|  | Single roll | 93 | 76 |

The cooling rate in the gas atomizing process was $10^{3°}$ to $10^{5°}$ C./sec, and the same in the single roll process was $10^{5°}$ to $10^{7°}$ C./sec. The further increase in cooling rate (ultrarapid cooling condition) caused homogeneous dispersion of Mo or made the resultant alloy amorphous, thereby decreasing the discharge capacity and the high-rate discharge characteristics at low temperatures. Rapid cooling of the alloy at the cooling rate of $10^{3°}$ to $10^{7°}$ C./sec enabled the alloy phases other than the mother phase to be finely distributed, thereby improving the discharge capacity and the high-rate discharge characteristics at low temperatures.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A hydrogen storage alloy represented by the general formula $Zr_{1-x}Ti_xMn_aV_bMo_cCr_dCo_eNi_f$, wherein $0<x\leq0.5$, $0.4\leq a\leq 0.8$, $0\leq b<0.3$, $0<c\leq 0.3$, $0<d\leq 0.3$, $0<e\leq 0.1$, $1.0\leq f\leq 1.5$, $0.1\leq b+c\leq 0.3$, $x\leq b+c+d+e$, and $1.7\leq a+b+c+d+e+f \leq 2.2$, said alloy having a C15($MgCu_2$) Laves phase as a main alloy phase.

2. The hydrogen storage alloy in accordance with claim 1, wherein said alloy comprises at least two different Mo-containing phases therein, one phase having a larger amount of Mo than the other phase.

3. The hydrogen storage alloy in accordance with claim 1, wherein said alloy has been prepared by abruptly cooling melted alloy at a cooling rate of $10^{3°}$ to $10^{7°}$ C./sec.

4. The hydrogen storage alloy in accordance with claim 1, wherein said alloy has been subjected to a heat treatment at a temperature of 900° to 1,300° C. in a vacuum or in an inert gas atmosphere.

5. A hydrogen storage alloy electrode comprising the hydrogen storage alloy in accordance with claim 1 or a hydride thereof.

* * * * *